(12) United States Patent
Tanjaya et al.

(10) Patent No.: US 11,378,478 B2
(45) Date of Patent: Jul. 5, 2022

(54) SENSOR ELEMENT FOR MEASURING PRESSURE AND TEMPERATURE

(71) Applicant: TDK Electronics AG, Munich (DE)

(72) Inventors: Johnsen Tanjaya, Berlin (DE); Wolfgang Schreiber-Prillwitz, Froendenberg (DE)

(73) Assignee: TDK ELECTRONICS AG, Munich (DE)

( * ) Notice: Subject to any disclaimer, the term of this patent is extended or adjusted under 35 U.S.C. 154(b) by 0 days.

(21) Appl. No.: 16/982,563

(22) PCT Filed: Mar. 19, 2019

(86) PCT No.: PCT/EP2019/056837
§ 371 (c)(1),
(2) Date: Sep. 20, 2020

(87) PCT Pub. No.: WO2019/180018
PCT Pub. Date: Sep. 26, 2019

(65) Prior Publication Data
US 2021/0025776 A1    Jan. 28, 2021

(30) Foreign Application Priority Data
Mar. 20, 2018  (DE) .......................... 102018106518.3

(51) Int. Cl.
*G01L 9/00*  (2006.01)
*G01L 19/00*  (2006.01)
*G01K 7/16*  (2006.01)

(52) U.S. Cl.
CPC ............ *G01L 19/0092* (2013.01); *G01K 7/16* (2013.01); *G01L 9/0054* (2013.01)

(58) Field of Classification Search
None
See application file for complete search history.

(56) References Cited

U.S. PATENT DOCUMENTS 7,051,595 B2   5/2006 Kwon et al.
10,670,482 B2   6/2020 Zehringer et al.
(Continued)

FOREIGN PATENT DOCUMENTS

CN  101082525 A  12/2007
CN  102221429 A  10/2011
(Continued)

OTHER PUBLICATIONS

Laser Zentrum Hannover, e.V., "New Types of Surface Sensors Defy Harsher Surroundings," Press Release, Mar. 8, 2011, 3 Pages.

*Primary Examiner* — Lisa M Caputo
*Assistant Examiner* — Nigel H Plumb
(74) *Attorney, Agent, or Firm* — Slater Matsil, LLP

(57) ABSTRACT

A sensor element is disclosed. In an embodiment, a sensor element with an increased level of integration includes a main part with a membrane and an edge zone arranged around the membrane and an electrically conductive layer having a first region arranged over the membrane of the main part and a second region arranged over the edge zone of the main part, wherein the membrane is a pressure-sensitive zone of the main part such that the membrane is configured to undergo deformation as a function of a pressure differential between an upper side and an underside of the membrane, wherein the edge zone is a pressure-insensitive zone, and wherein the electrically conductive layer is structured in the second region such that at least one temperature-dependent resistance is formed in the second region of the electrically conductive layer.

10 Claims, 5 Drawing Sheets

(56) References Cited

U.S. PATENT DOCUMENTS

2003/0164047 A1   9/2003  Fujita et al.
2009/0126498 A1   5/2009  Gilch et al.

FOREIGN PATENT DOCUMENTS

| | | |
|---|---|---|
| DE | 102005017853 A1 | 10/2006 |
| DE | 102013011157 B3 | 1/2015 |
| DE | 102015222756 A1 | 5/2017 |
| EP | 2554964 B1 | 4/2016 |
| JP | 2694594 B2 | 12/1997 |
| JP | 2573535 Y2 | 6/1998 |
| JP | 2005351901 A | 12/2005 |

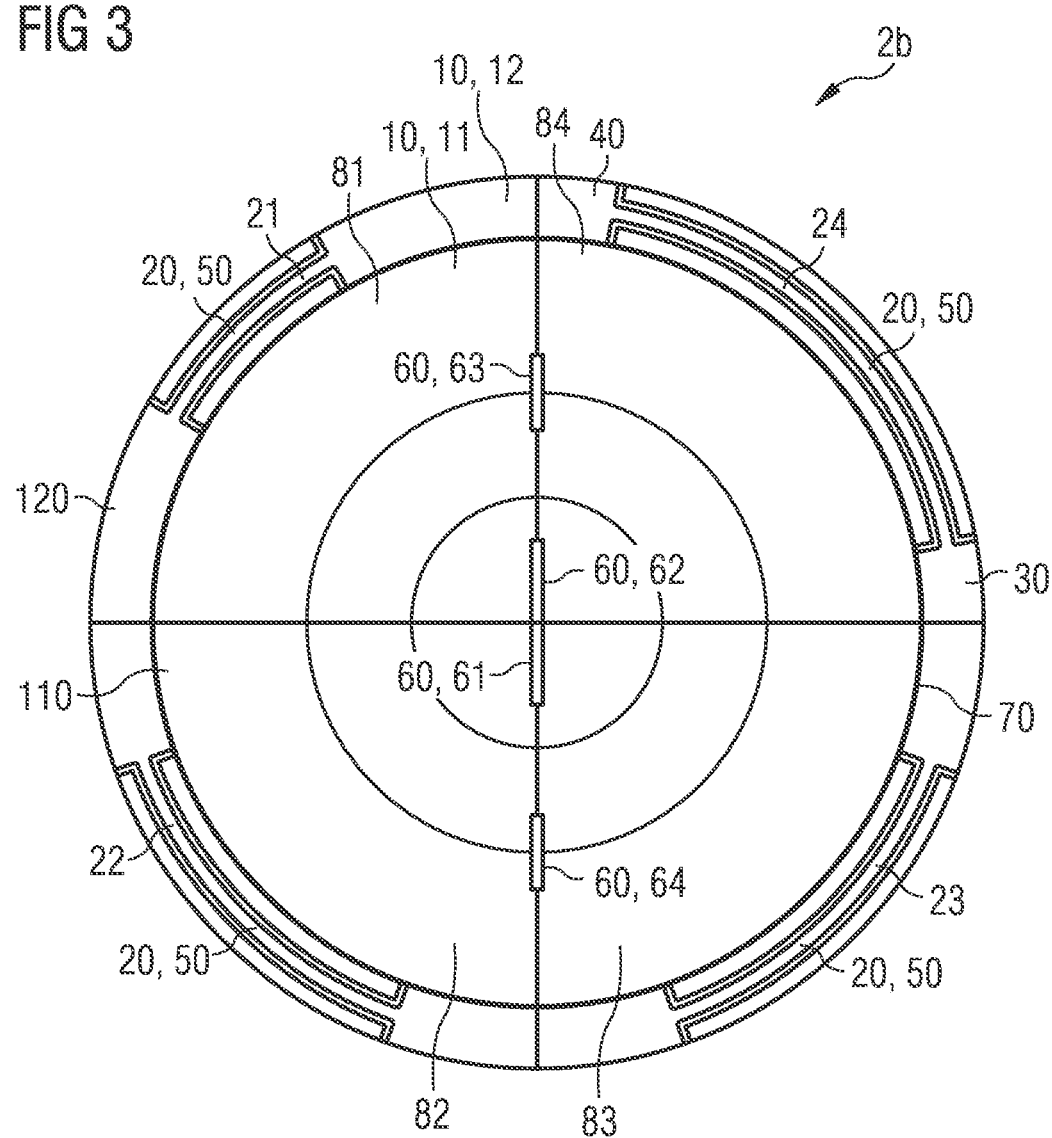

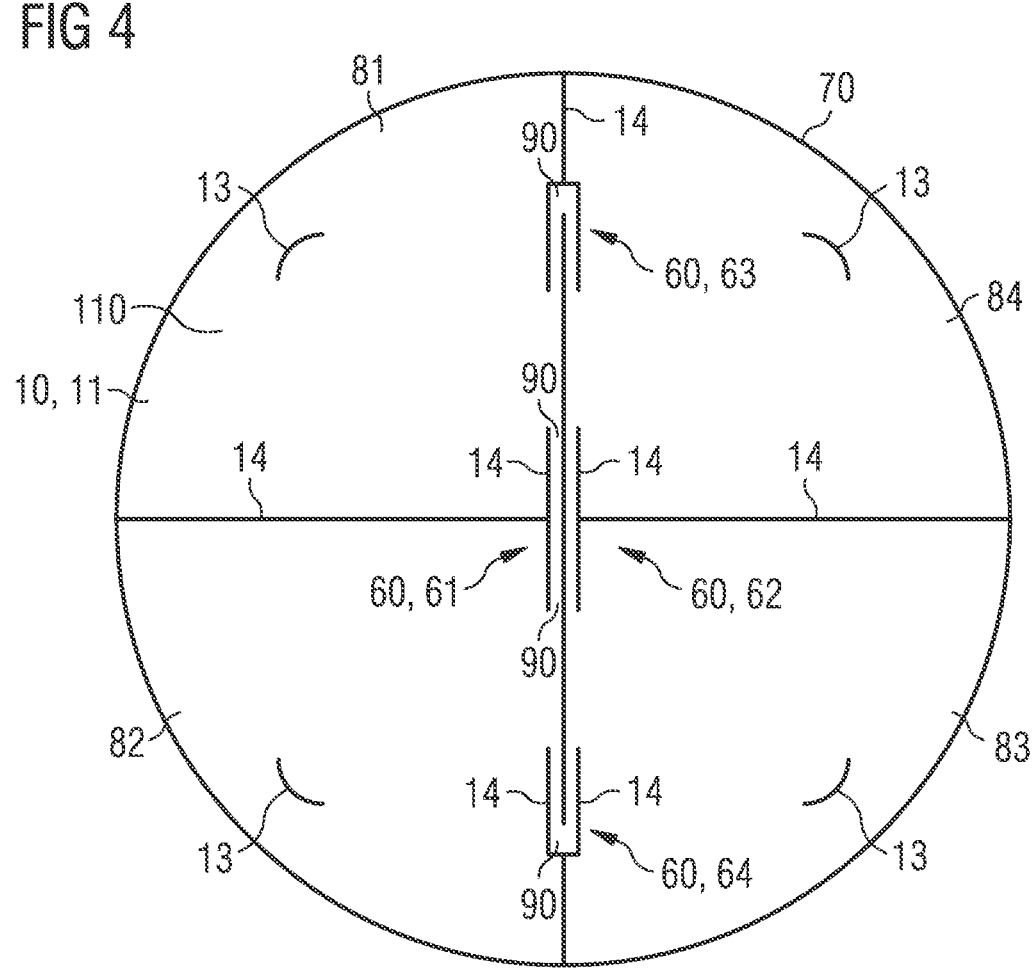

SENSOR ELEMENT FOR MEASURING PRESSURE AND TEMPERATURE

This patent application is a national phase filing under section 371 of PCT/EP2019/056837, filed Mar. 19, 2019, which claims the priority of German patent application 102018106518.3, filed Mar. 20, 2018, each of which is incorporated herein by reference in its entirety.

TECHNICAL FIELD

The invention relates to a sensor element for measuring pressure and temperature.

BACKGROUND

Sensors for measuring pressure which are based upon a thin-film technology comprise a main part with a thin region, which is configured as a membrane. In dependence upon the reference pressure, for example, a pressure of the ambient atmosphere which acts on the upper side of the membrane, and a pressure to be measured, which acts on the underside of the membrane, a deformation of the membrane occurs. The deformation of the membrane can be detected electrically. In the case of a resistive pressure sensor, a sensor layer is arranged on the membrane, the electrical resistance of which varies according to a deformation of the membrane.

SUMMARY

In many fields of application, in addition to pressure information, temperature information on the temperature prevailing in the environment of the sensor is also required. In many applications, temperature and pressure information is required, for example, for the control and/or regulation of a system.

Embodiments provide a sensor element for measuring pressure and temperature, wherein the sensor element has a function for the measurement of pressure and also of temperature, and the measurement of pressure and temperature can be integrated in the sensor element in a space-saving manner, and with limited complexity of manufacture.

One embodiment of a sensor element for measuring pressure and temperature, wherein the pressure measuring function and the temperature measuring function can be integrated in the sensor element using simple production technology, is specified in patent claim 1.

The sensor element for measuring pressure and temperature comprises a main part with a membrane and an edge zone which is arranged around the membrane. The sensor element additionally comprises an electrically conductive layer, having a first region which is arranged over the membrane of the main part. The electrically conductive layer further comprises a second region, which is arranged over the edge zone of the main part. The membrane is configured as a pressure-sensitive zone of the main part, such that the membrane undergoes deformation, as a function of a pressure differential between the upper side and the underside of the membrane. The edge zone, conversely, is configured as a pressure-insensitive zone of the main part. The electrically conductive layer in the second region, i.e., over the edge zone of the main part, is structured such that, in the second region of the electrically conductive layer, at least one temperature-dependent resistance is formed.

In the first region of the electrically conductive layer, at least one pressure-dependent resistance can be arranged. Since the temperature-dependent resistance is arranged in the second region of the electrically conductive layer, i.e., in the pressure-insensitive edge zone outside the membrane, the same electrically conductive material used to constitute the at least one pressure-dependent resistance in the first region of the electrically conductive layer can also be present in the second region. To constitute the electrically conductive layer, the same material can be used in the first region and in the second region of the electrically conductive layer.

Since the electrically conductive layer in the first region over the membrane and in the second region over the edge zone is constituted of the same material, a single structuring method can be used for the structuring of the at least one temperature-dependent resistance and of the at least one pressure-dependent resistance. The structuring of the electrically conductive layer for the production of the at least one temperature-dependent resistance and of the at least one pressure-dependent resistance can be effected in a single process step, using the same structuring method. The structuring of the electrically conductive layer in the first region for the production of the at least one pressure-dependent resistance and the structuring of the electrically conductive layer in the second region for the production of the at least one temperature-dependent resistance can be effected, for example, by laser cutting. Given that, for the production of the at least one pressure-dependent resistance and of the at least one temperature-dependent resistance, the same structuring method can be used, the sensor element for measuring pressure and temperature can be manufactured using simple production technology, and thus in a cost-effective manner.

To form the at least one temperature-dependent resistance, the second region of the electrically conductive layer is structured such that, in the second region of the electrically conductive layer, a printed conductor is formed. Moreover, the second region of the electrically conductive layer can be structured such that, in said second region of the electrically conductive layer, contact surfaces for the contact-connection of the printed conductor are formed. The width and/or length of the printed conductor determines the resistance value of the temperature-dependent resistance at a specific temperature.

The structuring of the electrically conductive layer, in the second region over the edge zone of the main part, can be effected such that, in the second region of the electrically conductive layer, a plurality of temperature-dependent resistances is arranged. These resistances can be structured such that, at the same temperature, they have the same or a similar resistance value, or have different resistance values.

If the temperature-dependent resistances in the second region of the electrically conductive layer assume the same resistance value at the same temperature, the respective printed conductor of the resistances can have the same width and/or length. The temperature-dependent resistances can be produced, for example, with different resistance values at the same temperature by the printed conductor of each resistance having a different width and/or length. Depending upon the application, in this embodiment, that temperature-dependent resistance can be used which is best-suited to the purpose of a particular application, without the need for additional space for this purpose or restrictions with respect to the output of the resistance value.

BRIEF DESCRIPTION OF THE DRAWINGS

The invention is described in greater detail hereinafter with reference to Figures which illustrate exemplary embodiments of the present invention.

In the Figures:

FIG. 3 shows an overhead view of a third embodiment of a sensor element for measuring pressure and temperature with pressure-dependent resistances and temperature-dependent resistances having a different resistance value; and FIG. 4 shows an overhead view of a sensor element for measuring pressure, with pressure-dependent resistances between segments of an electrically conductive layer of the sensor element.

DETAILED DESCRIPTION OF ILLUSTRATIVE EMBODIMENTS

Figure 1:
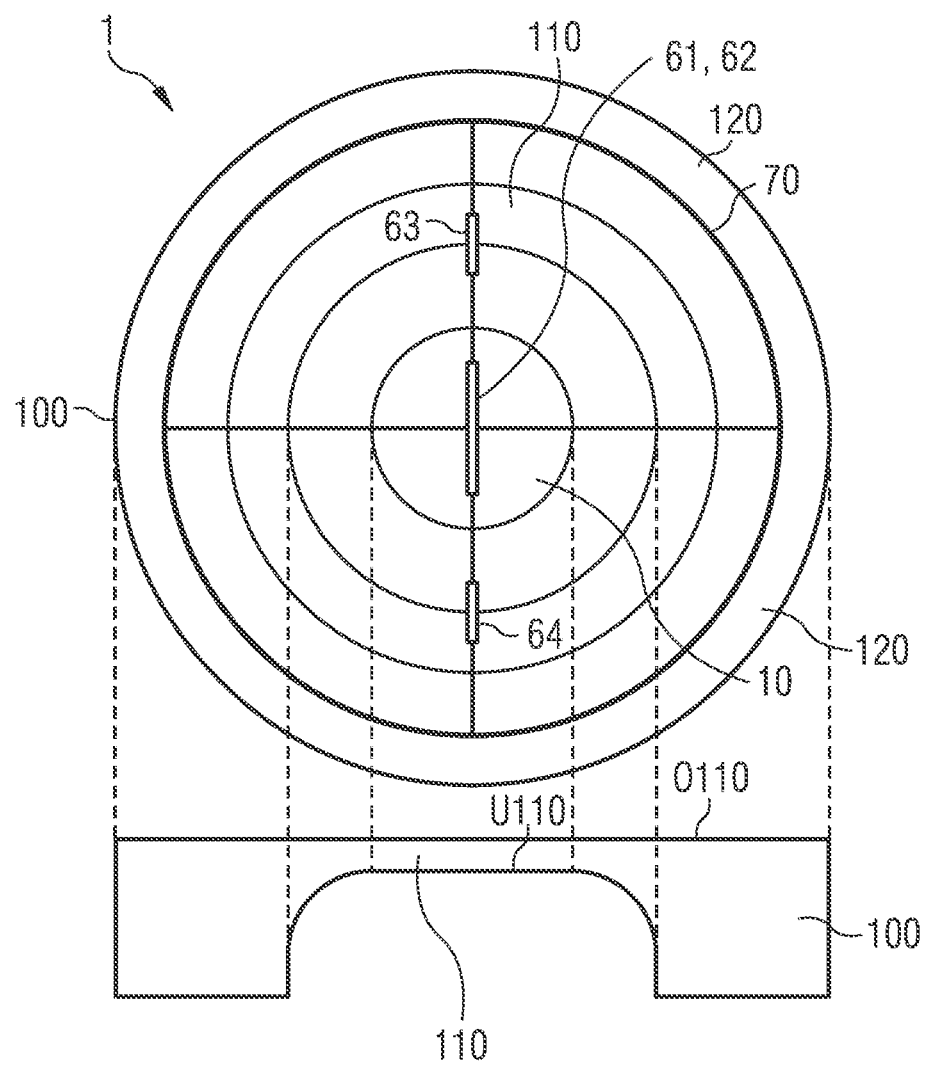
FIG. 1 shows an overhead view and a transverse view of a sensor element for measuring pressure with pressure-dependent resistances.

FIG. 1 shows an overhead view in the upper part of the image, and a transverse view in the lower part of the image, of a sensor element 1 for measuring pressure. The sensor element comprises a main part 100 having a pressure-sensitive membrane no and a pressure-insensitive edge zone 120, which is arranged around the membrane 110. The membrane 110 is separated from the pressure-insensitive edge zone 120 of the main part 100 by an insulating zone 70. An electrically conductive layer 10 is arranged over the membrane 110. The electrically conductive layer 10 is configured as a sensor layer which possesses piezoresistive properties, for example. The main part 100, on an underside U110 of the membrane, incorporates a cavity. The medium, the pressure of which is to be measured, acts on the underside U110 of the membrane 110. A reference pressure, for example the ambient pressure, acts on the upper side O110 of the membrane.

The membrane 110 is configured as a pressure-sensitive zone of the main part 100. As a function of a pressure differential between the upper side O110 and the underside U110 of the membrane, the membrane 110 undergoes a deformation. As a result of the deformation of the membrane 110, the electrical resistance of the sensor layer 10 changes. By the evaluation of the resulting variation in resistance, the pressure on the underside U110 of the membrane, in relation to the reference pressure on the upper side O110 of the membrane 110, can be determined. By structuring the electrically conductive layer 10, one or more pressure-dependent resistances 61, 62, 63 and 64 can be arranged in the electrically conductive layer.

Figure 2A:
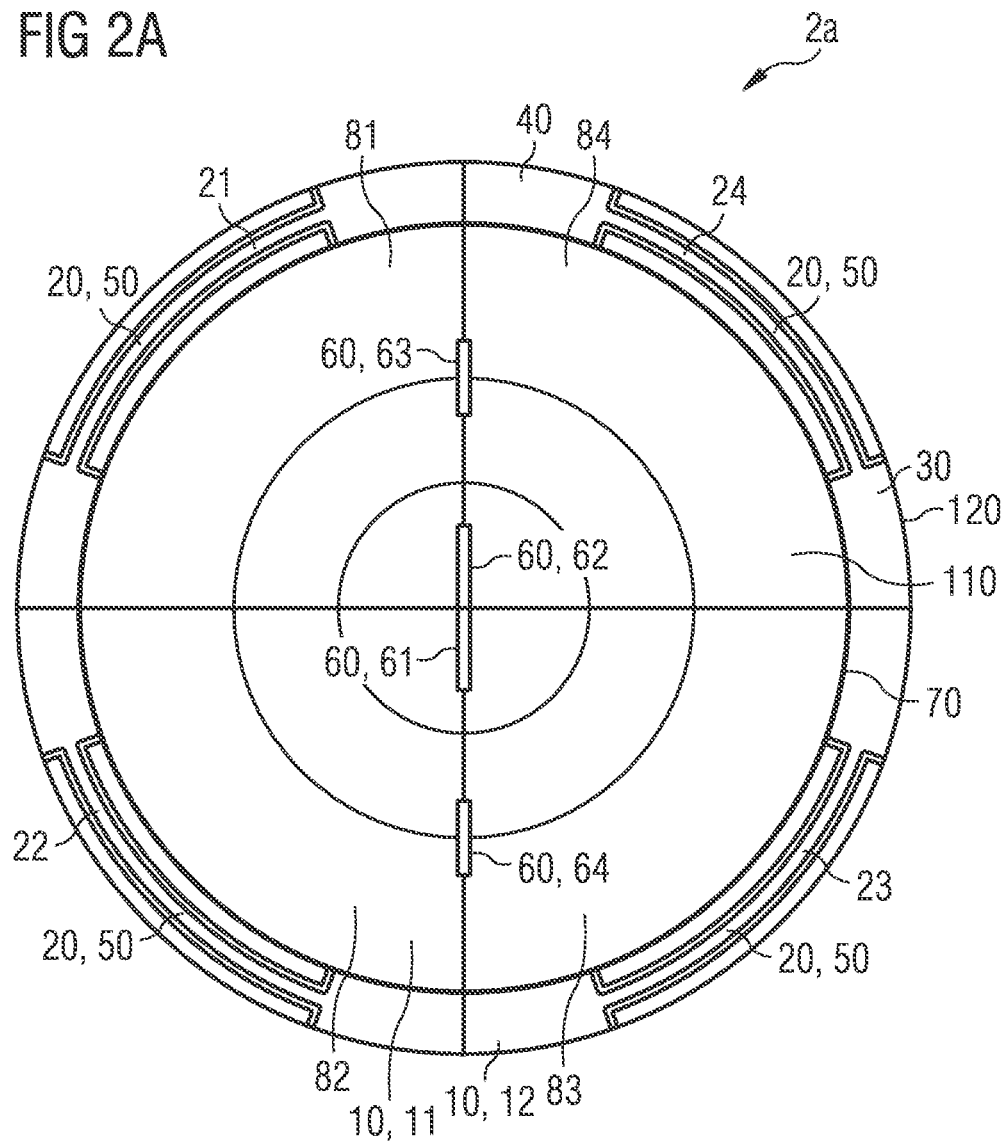
FIG. 2A shows an overhead view of a first embodiment of a sensor element for measuring pressure and temperature with pressure-dependent resistances and temperature-dependent resistances.

FIG. 2A shows an overhead view of a first embodiment of a sensor element 2a for measuring pressure and temperature, wherein both the pressure measuring function and the temperature measuring function are integrated in the sensor element. The sensor element comprises a main part 100 with a membrane 110 and an edge zone 120 arranged around the membrane 110. The sensor element 1 additionally comprises an electrically conductive layer 10, which is configured as a sensor layer for measuring pressure and temperature. The electrically conductive layer 10 comprises a first region 11, which is arranged over the membrane 110 of the main part 100. The electrically conductive layer 10 additionally comprises a second region 12, which is arranged over the edge zone 120 of the main part 100.

Figure 2B:
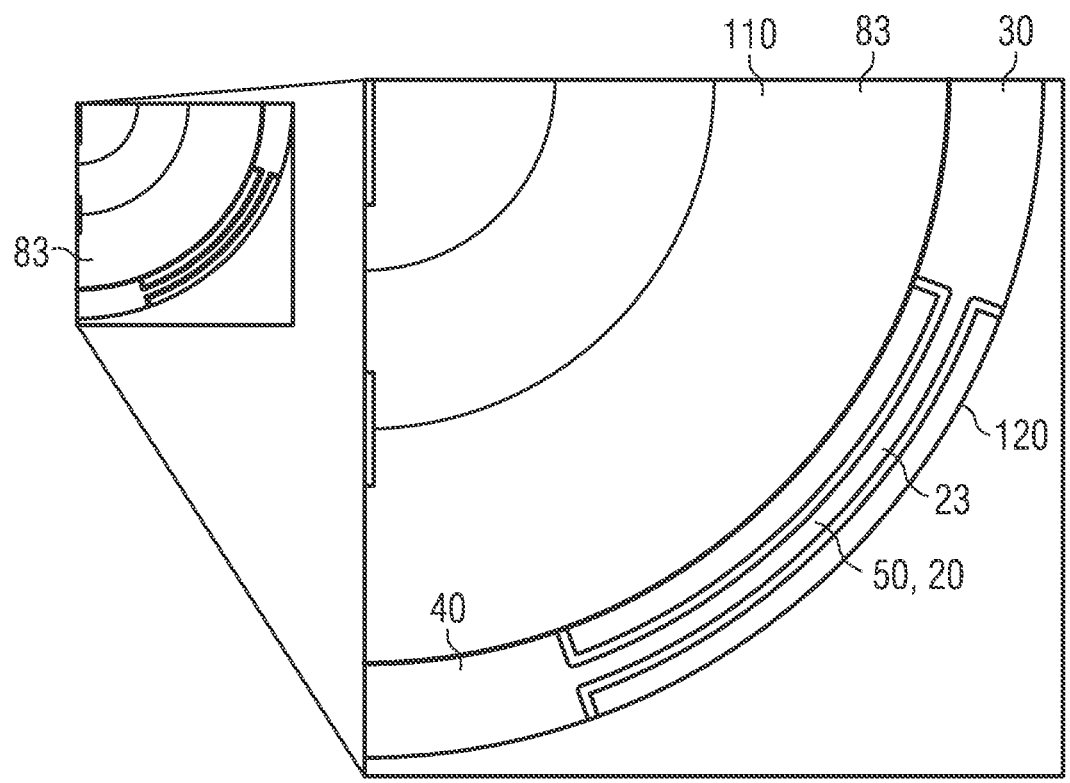
FIG. 2B shows an enlarged representation of a segment of an electrically conductive layer of a sensor element for measuring pressure and temperature, with a temperature-dependent resistance in the edge zone of the main part of the sensor element.

The first region 11 of the electrically conductive layer 10 is subdivided into a plurality of segments 81, 82, 83, 84. Between the individual segments, the electrically conductive layer is interrupted in the region 11. FIG. 2B shows the sensor element 2a, with an enlarged section of the segment 83 of the electrically conductive layer 10.

The membrane 110 is configured as a pressure-sensitive zone of the main part 100. As per the embodiment of the sensor element represented in FIG. 1, the membrane 110 in the sensor element 2a is configured as a thin region of the main part 100. The membrane 110 is configured as a pressure-sensitive zone of the main part such that the membrane, as a function of a pressure differential between the upper side and the underside of the membrane, which faces the measuring cell, undergoes a deformation. The edge zone 120 of the main part 100 is configured as a pressure-insensitive zone of the main part. Accordingly, in the region of the edge zone 120, no deformation of the main part 100 occurs.

In order to perform a temperature measurement, the electrically conductive layer 10 in the second region 12, i.e., in the region over the pressure-insensitive edge zone of the main part 100, is structured such that, in the second region 12 of the electrically conductive layer, at least one temperature-dependent resistance 20 is configured.

In the sensor element 2a represented in FIGS. 2A and 2B, the electrically conductive layer 10 in the second region 12 is structured such that, in the second region 12 of the electrically conductive layer 10, a plurality of temperature-dependent resistances 20 are present. In particular, the second region 12 of the electrically conductive layer 10 can be structured such that the second region 12 comprises a first temperature-dependent resistance 21 and at least one second temperature-dependent resistance 22, 23, 24. In the embodiment of the sensor element 2a represented in FIG. 2A, the sensor element in the second region 12 of the electrically conductive layer 10 comprises the temperature-dependent resistances 21, 22, 23 and 24. Depending upon the application, one or more of the resistances can be used for temperature measurement, or be connected to an electric circuit.

Each of the resistances 21, 22, 23, 24 lies in a section of the region 12 of the electrically conductive layer which, to the exterior, engages with one of the segments 81, 82, 83 and 84 of the region 11 of the electrically conductive layer 10. The segments 81, 82, 83 and 84 are separated from the various sections of the region 12 of the electrically conductive layer 10 by the insulating zone 70. The segments 81, 82, 83 and 84 and the respective sections of the region 12 of the electrically conductive layer 10 are configured, for example, as quarter-circle segments/sections.

The electrically conductive layer 10, in the second region 12, is structured such that the electrically conductive layer 10 in the second region 12 comprises at least one first contact surface 30 and at least one second contact surface 40 for the external contact-connection of the at least one temperature-dependent resistance 20. Moreover, the electrically conductive layer 10, in the second region 12, is structured such that the at least one temperature-dependent resistance 20 is configured as a printed conductor 50. The respective printed conductor 50 of a temperature-dependent resistance is connected to a respective first contact surface 30 and to a respective second contact surface 40 of the temperature-dependent resistance. In particular, the respective printed conductor 50 is arranged between the respective first and second contact surface 30, 40.

The width of the respective printed conductor 50 is smaller than the width of the respective first and second contact surface 30 and 40 which are connected thereto. Each printed conductor 50 of the temperature-dependent resistances 21, 22, 23 and 24 is configured as a narrow strip of the electrically conductive layer 10, which strip is separated from the surrounding planar sections of the electrically conductive layer by an interruption of the electrically conductive layer.

In the embodiment of the sensor element 2a represented in FIGS. 2A and 2B, the first temperature-dependent resistance 21 and the least one second temperature-dependent resistance 22, 23, 24 assumes the same resistance value at the same temperature. To this end, the width and/or length of the respective printed conductor 50 of the temperature-dependent resistances 21, 22, 23 and 24 can be equal.

FIG. 3 shows a second embodiment of a sensor element 2b for measuring pressure and temperature. The sensor element 2b, as per the embodiment represented in FIGS. 2A and 2B, comprises an electrically conductive layer 10 having a first region 11, which is arranged over the membrane 110 of the main part 100, and a second region 12, which is arranged over the edge zone 120 of the main part 100. The membrane 110 is configured as a pressure-sensitive zone of the main part, whereas the edge zone 120 of the main part 100 is configured as a pressure-insensitive zone.

As per the embodiment represented in FIG. 2A, the electrically conductive layer 10, in the second region 12, is structured such that at least one temperature-dependent resistance 20 is formed in the second region 12 of the electrically conductive layer. In the embodiment represented in FIG. 3, the temperature-dependent resistances 21, 22, 23 and 24 are formed in the second region 12 of the electrically conductive layer 10. The electrically conductive layer 10, in the second region 12, is structured such that the electrically conductive layer 10 in the second region 12 comprises at least one first contact surface 30 and at least one second contact surface 40 for the external contact-connection of the at least one temperature-dependent resistance 20.

The electrically conductive layer 10, in the second region 12, is structured such that the temperature-dependent resistances 21, 22, 23 and 24 are respectively configured in the form of a printed conductor 50. The respective printed conductor 50 of the temperature-dependent resistances is respectively arranged between one of the first contact surfaces 30 and one of the second contact surfaces 40, and is connected to a respective first contact surface 30 and to a respective second contact surface 40.

By way of distinction from the embodiment of the sensor element 2a represented in FIG. 2A, in the sensor element 2b, the electrically conductive layer 10, in the second region 12, is structured such that the various temperature-dependent resistances 21, 22, 23 and 24 assume a different resistance value at an equal temperature.

To this end, the temperature-dependent resistances 21, 22, 23 and 24 have a different width and/or length of their respective printed conductor 50. In the embodiment represented in FIG. 3, depending upon the application, one of the temperature-dependent resistances, which is most suitable for integration in an electric circuit, can be used for measuring temperature. By arranging the temperature-dependent resistances 21, 22, 23 and 24 in the second region 12 of the electrically conductive layer 10, i.e., over the pressure-insensitive edge region 120 of the main part 100, a plurality of temperature-dependent resistances having a different resistance value can thus be provided, without the need for additional space, in comparison with the embodiment of a sensor element 1 represented in FIG. 1, which is used exclusively for measuring pressure or restrictions with respect to the read-out of resistance values.

FIG. 4 shows an overhead view of the membrane 110 or the first region 11 of the electrically conductive layer 10 of the sensor elements 2a and 2b. The electrically conductive layer 10, in the first region 11, is structured such that the electrically conductive layer in the first region 11 comprises at least one pressure-dependent resistance 60. In particular, the electrically conductive layer 10, in the sensor elements 2a and 2b is structured such that the electrically conductive layer 10, in the first region 11, comprises a plurality of pressure-dependent resistances 61, 62, 63 and 64. The electrically conductive layer 10 is configured as a sensor layer, which has piezoresistive properties. In the event of a deformation of the membrane 110 as a result of a pressure differential between the upper side and underside of the membrane, a variation occurs in the resistance of the resistances 61, 62, 63 and 64.

In the embodiments of the sensor element 2a, 2b represented in FIGS. 2A, 3 and 4, the electrically conductive layer 10 comprises the pressure-dependent resistances 61, 62, 63 and 64 in the first region 11. The resistances 61, 62, 63 and 64 advantageously form a resistance bridge, in order to compensate any variation in the resistance of the electrically conductive layer 10 in the first region 11, as a result of ageing or a fluctuating temperature during pressure measurement.

The first region 11 of the electrically conductive layer 10 is subdivided into a plurality of segments 81, 82, 83 and 84. The segments of the electrically conductive layer 10 are isolated from one another by means of interruptions 14 in the electrically conductive layer 10. Two respectively adjoining segments are electrically connected to one another by means of one of the pressure-dependent resistances 61, 62, 63 and 64. The surface area of the segments 81, 82, 83 and 84 is greater than the surface area of the pressure-dependent resistances 61, 62, 63 and 64. The pressure-dependent resistances 61, 62, 63, 64 are respectively formed as a path 90 which is defined by the interruption of the first region 11 of the electrically conductive layer 10. By means of the path 90, two adjoining segments 81, 82 or 81, 84, and 82, 83 or 83, 84 are electrically interconnected.

Electrical contacts 13 for the contact-connection of the pressure-dependent resistances 61, 62, 63 and 64 are arranged in a neutral region 140 of the membrane 110. In the neutral region 140, no compression or stretching of the sensor layer 10 occurs in the event of a curvature of the membrane 110. Accordingly, no damage is sustained by the electrical contacts for the contact-connection of the pressure-dependent resistances.

A method for producing a sensor element for measuring pressure and temperature is disclosed hereinafter. For the production of the sensor element 2a and 2b, a main part 100 having a membrane 110 and an edge zone 120 arranged around the membrane 110 is firstly provided. The main part 100 can be constituted of a ceramic material or, for example, of a (non-corroding) steel. The membrane 110 is configured as a pressure-sensitive zone of the main part 100, such that the membrane 110, as a function of a pressure differential between the upper side O110 and the underside U110 of the membrane, undergoes a deformation. The edge zone 120 is configured as a pressure-insensitive zone of the main part 100.

The electrically conductive layer 10 is applied to the first region 11 over the membrane 110 of the main part 100, and to the second region 12 over the edge zone 120 of the main part 100. The electrically conductive layer 10 comprises a piezoresistive material. Composite materials, such as nickel-carbon, cobalt-carbon or palladium-carbon, for example, in which highly conductive metal particles are incorporated in amorphous carbon, can be used for the electrically conductive layer 10.

If the main part 100 comprises a ceramic material, the electrically conductive layer 10 can be precipitated directly onto the ceramic substrate of the main part 100. In particular, no insulating layer is required between the ceramic substrate of the main part 100 and the electrically conductive layer 10. As a result, the complexity of process steps required for the production of the sensor element 2a and 2b is relatively limited.

The electrically conductive layer 10, in the second region 12, is structured such that at least one temperature-dependent resistance 20 is formed in the second region 12 of the electrically conductive layer 10. Moreover, the electrically conductive layer 10, in the second region 12, is structured such that the electrically conductive layer 10 in the second region 12 comprises a first contact surface 30 and a second contact surface 40 for the external contact-connection of the at least one temperature-dependent resistance 20. Furthermore, the electrically conductive layer 10, in the second region 12, is structured such that the at least one temperature-dependent resistance 20 is configured in the form of a printed conductor, which is connected to the first and the second contact surface 30 and 40.

Since the at least one temperature-dependent resistance is configured in the second region 12 of the electrically conductive layer 10, i.e., in the pressure-insensitive zone of the main part 100, the electrically conductive layer 10, in the first region 11 incorporating the at least one pressure-dependent resistance 60, and in the second region 12 incorporating the at least one temperature-dependent resistance 20, can be produced from the same material. Since the electrically conductive layer 10, in the first region 11 and in the second region 12, comprises the same material, the electrically conductive layer 10 in the first and second region can be structured by the same method. For structuring, for example a laser cutting method can be used. Laser processing, in comparison with a photolithographic method, constitutes a simpler production technology, and a more cost-effective process method.

The invention claimed is:

1. A sensor element comprising:
   a main part with a membrane and an edge zone arranged around the membrane; and
   an electrically conductive layer having a first region arranged over the membrane of the main part and a second region arranged over the edge zone of the main part,
   wherein the membrane is a pressure-sensitive zone of the main part such that the membrane is configured to undergo deformation as a function of a pressure differential between an upper side and an underside of the membrane,
   wherein the edge zone is a pressure-insensitive zone of the main part,
   wherein the electrically conductive layer is structured in the second region such that at least one temperature-dependent resistance is formed in the second region of the electrically conductive layer,
   wherein the sensor element is configured, based on the electrically conductive layer, to measure pressure and temperature, and
   wherein the electrically conductive layer comprises the same material in the first region and in the second region.

2. The sensor element according to claim 1, wherein the electrically conductive layer is structured in the second region such that the electrically conductive layer comprises a first and a second contact surface for external contact-connection of the at least one temperature-dependent resistance in the second region.

3. The sensor element according to claim 2, wherein the electrically conductive layer is structured in the second region such that the at least one temperature-dependent resistance is a printed conductor connected to the first and the second contact surface.

4. The sensor element according to claim 3,
   wherein the printed conductor of the temperature-dependent resistance is arranged between the first and second contact surface, and
   wherein a width of the printed conductor is smaller than a width and/or a length of the first and second contact surface.

5. The sensor element according to claim 3,
   wherein the at least one temperature-dependent resistance comprises a first temperature-dependent resistance and at least one second temperature-dependent resistance, and
   wherein the first temperature-dependent resistance and the at least one second temperature-dependent resistance have a different width and/or a different length of their respective printed conductor.

6. The sensor element according to claim 1, wherein the electrically conductive layer is structured in the first region such that the electrically conductive layer in the first region comprises at least one pressure-dependent resistance.

7. The sensor element according to claim 1, wherein the first and second regions of the electrically conductive layer are electrically isolated from one another by an insulating zone.

8. The sensor element according to claim 1,
   wherein the electrically conductive layer is structured in the first region such that the electrically conductive layer in the first region comprises a plurality of pressure-dependent resistances, and
   wherein the plurality of pressure-dependent resistances forms a resistance bridge.

9. The sensor element according to claim 8,
   wherein the first region of the electrically conductive layer is subdivided into a plurality of segments,
   wherein two respectively adjoining segments are electrically connected to one another by one of the pressure-dependent resistances,
   wherein a surface area of the segments is greater than a surface area of the pressure-dependent resistances, and
   wherein the pressure-dependent resistances are respectively formed as a path which is defined by interruption of the first region of the electrically conductive layer by which two adjoining segments are electrically connected.

10. A sensor element comprising:
    a main part with a membrane and an edge zone arranged around the membrane; and
    an electrically conductive layer having a first region arranged over the membrane of the main part and a second region arranged over the edge zone of the main part,
    wherein the membrane is a pressure-sensitive zone of the main part such that the membrane is configured to undergo deformation as a function of a pressure differential between an upper side and an underside of the membrane, wherein the edge zone is a pressure-insensitive zone of the main part, wherein the electrically conductive layer is structured in the second region such that at least one temperature-dependent resistance is formed in the second region of the electrically conductive layer, wherein the sensor element is configured to measure pressure and temperature, and wherein the first and second regions of the electrically conductive layer are electrically isolated from one another by an insulating zone.

* * * * *